May 3, 1932.  O. L. WOODSON ET AL  1,856,306
AVIATION TRAINING APPARATUS
Filed July 7, 1930   2 Sheets-Sheet 1
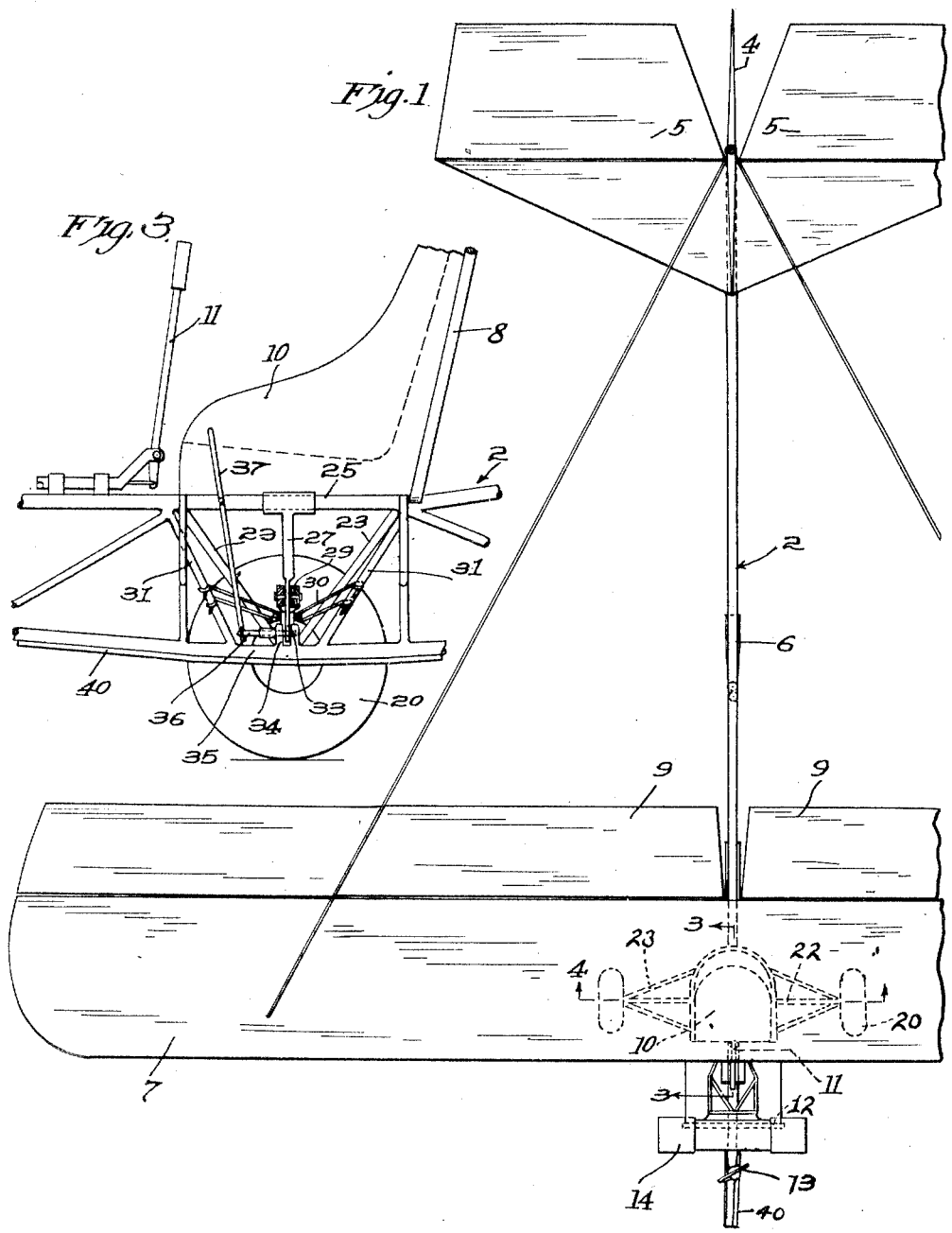
INVENTORS.
Omer L. Woodson,
Harry S. Myhres,
BY R. W. Smith
ATTORNEY.

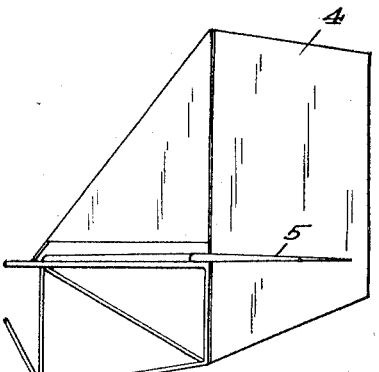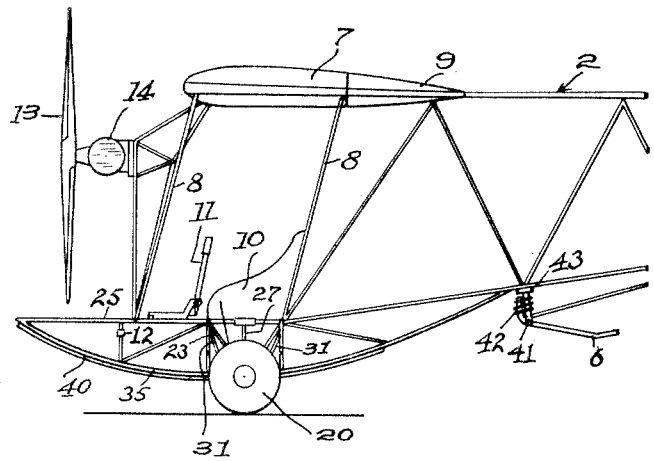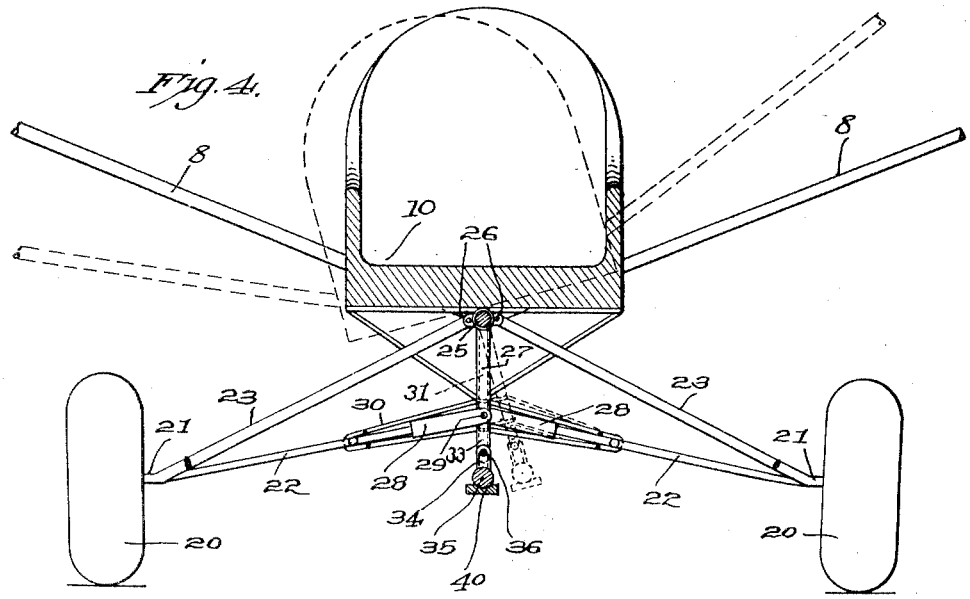

Patented May 3, 1932

1,856,306

UNITED STATES PATENT OFFICE

OMER L. WOODSON AND HARRY S. MYHRES, OF LOS ANGELES, CALIFORNIA, ASSIGNORS TO THE CYCLOPLANE COMPANY, LTD., OF LOS ANGELES, CALIFORNIA, A CORPORATION OF CALIFORNIA

AVIATION TRAINING APPARATUS

Application filed July 7, 1930. Serial No. 465,874.

This invention is an apparatus for giving primary instructions in the principles of aviation without leaving the ground; and has for its object to teach and enable a student to practice synchronized movements simulating the control of an airplane in flight, while propelled along the surface of the ground at a safe speed.

More particularly it is an object of the invention to provide a vehicle which is adapted to carry a student and which has a wing surface and elevating and directional rudders, simulating in a general way the corresponding elements of an airplane, and actuated by the student through controls exactly similar to those of an airplane, so that by operating the controls the student, while still on the ground, may practice directional movement and longitudinal and lateral stabilizing of the apparatus.

It is a further object of the invention to provide an apparatus comprising vehicular running gear and a rearwardly projecting spine preferably adapted for longitudinal tilt relative to the ground contacting wheels of the running gear and provided at its tail with directional and elevating rudders, whereby the direction of movement of the apparatus may be controlled, and the tail may be elevated from the ground so as to stabilize the structure on an even keel while supported entirely by the running gear at the front of the spine structure.

It is a still further object of the invention to provide the apparatus with lateral wings forming a plane surface having ailerons and simulating the usual supporting planes of an airplane, with the plane surface transversely tiltable or swingable with relation to the running gear so that with the running gear in contact with the ground, the student by operating the ailerons may be taught to stabilize the plane surface against lateral tilt with relation to the running gear.

It is a still further object of the invention to tension the laterally tiltable plane surface with relation to the running gear, so as to prevent excessive tilting of the plane surface when controlled by a novice, as might result in the tip of the plane striking the ground, with the tensioning means providing such yielding resistance to tilting of the plane surface as will simulate the inherent stability of an airplane in rapid flight and thereby teach the student the "feel" of an airplane, without his leaving the ground and while propelled at only the comparatively slow speed at which the apparatus is adapted to be operated.

It is a still further object of the invention to lock the plane surface against lateral tilt or swinging with relation to the running gear when first instructing a student, so that the novice may first learn directional and fore-and-aft control by operating the directional and elevating rudders without paying any attention to lateral stabilization; and after directional and longitudinal control has been mastered, the locking means may be released for tensioned lateral tilting of the plane surface with relation to the running gear, in order that the student may then be taught to laterally stabilize the plane surface and coordinate such control with his previously acquired knack of directional and fore-and-aft control.

It is a still further object of the invention to preferably adapt the plane surface of the apparatus for restricted lifting power such as will not raise the running gear from the ground when the device is propelled at the comparatively slow speed at which it is adapted to be operated, thereby insuring safety of operation while permitting the student to actually control the direction of movement and both the longitudinal and lateral stability of the apparatus.

It is a still further object of the invention to preferably proportion the surfaces of the directional and elevating rudders with relation to the surface of the supporting plane and with relation to the size of the entire apparatus, and to also proportion the surface of the ailerons with relation to the entire surface of the supporting plane, so that the apparatus may be directionally controlled and both longitudinally and laterally stabilized by pressure on the controls similar to that which is required to control an airplane in flight, but with the apparatus propelled at a comparatively slow speed which need in no way approximate the speed of an airplane in flight.

Further object of the invention will be readily understood from the following description of the accompanying drawings, in which:

Fig. 1 is a top plan view of the apparatus.
Fig. 2 is a side elevation of the same.
Fig. 3 is a detail longitudinal section on the line 3—3 of Fig. 1.
Fig. 4 is a fragmentary transverse section on the line 4—4 of Fig. 1.

In the illustrated embodiment the invention is shown as comprising running gear supporting an elongated trussed frame or spine 2 which carries a supporting plane and preferably includes directional and elevating rudders.

The spine 2 is shown as supported at its front end on the running gear, and projects rearwardly therefrom medially of the width of the running gear, with directional and elevating rudders 4 and 5 mounted in usual manner at the tail of the spine, which may be provided with a usual tail skid 6. Lateral wings forming a supporting plane 7 are mounted at the front of spine 2 above the running gear, and may be fixed in usual manner with relation to the spine by means of braces 8; and the supporting plane 7 includes usual ailerons 9 pivoted at the rear edges of the lateral wings and adapted for movement to laterally stabilize and bank the supporting plane.

A seat 10 is fixed in the frame 2 above the running gear and below the supporting plane 7, and a usual stick 11 in front of the seat controls the elevating rudder 5 by usual fore-and-aft movement, and controls the ailerons 9 by usual lateral tilting of the stick. A usual rudder bar 12 which is adapted for engagement by the feet is mounted in frame 2 in front of seat 10, and controls the directional rudder 4 in usual manner.

The apparatus may be moved along the surface of the ground in any usual manner, and in the present instance is provided with a propeller 13 which may be driven by an engine 14 mounted at the front of frame 2. The device is adapted for propulsion at non-excessive speed which will insure safety of operation, and the supporting plane 7 is so designed and is of such limited area proportional to the normal area of the supporting plane of an airplane, that at the relatively slow speed at which the apparatus is adapted to be propelled, the lifting tendency of plane 7 will not raise the running gear from the ground. As an instance of such construction the area of supporting plane 7 may be only approximately 60% of the normal area of the supporting plane of an airplane.

The surfaces which control directional movement and stability of the apparatus are so proportioned with relation to the supporting plane 7, and with relation to the size and weight of the entire apparatus, that operating said controls when the apparatus is moving at its comparatively slow speed, will have approximately the same effect and will produce the same "feel" as similar control of the corresponding but proportionally smaller elements of an airplane in rapid flight. For this purpose the ailerons 9 may be approximately 30% of the area of supporting plane 7 instead of approximately 12%, as in typical airplane designing, and the directional rudder 4 and elevating rudder 5 may be respectively approximately 30% and 60% of the area of ailerons 9.

The supporting plane 7 and the directional and elevating rudders 4—5, together with seat 10 and controls 11—12, being supported by the frame 2 form a unitary structure therewith, and this unitary structure is adapted for fore-and-aft tilt relative to the ground contacting wheels of the running gear so that when the apparatus is at rest the tail or spine 2 is supported by tail skid 6 resting on the ground, and when the apparatus is moved along the ground the tail of the spine may be lifted clear of the earth by actuating rudder 5, so that by proper fore-and-aft adjustment of stick 11 the apparatus may be held on an even keel in a fore-and-aft direction.

As an instance of this arrangement the running gear may comprise laterally spaced ground wheels 20 journaled on stub axles 21 which are connected by lateral rods 22, with angular braces 23 extending from the respective stub axles and connected to frame 2 at longitudinally spaced points, preferably in front and in rear of seat 10 as shown in Fig. 2. The frame 2 is thus fixed relative to the stub axles in a fore-and-aft direction, and with wheels 20 in contact with and moving along the ground, the stub axles are adapted to turn in the wheel bearings for longitudinal tilt of the apparatus.

The plane surface is adapted for lateral tilting or swinging with relation to the running gear, preferably by pivoting the frame 2 for transverse swinging; and the front of frame 2 which is thus pivoted relative to the running gear preferably has a cushioned support so as to insure easy riding and thus simulate the conditions of an airplane in flight, irrespective of surface irregularities encountered by the ground engaging wheels. As an instance of this arrangement the braces 23 are pivoted to the main longitudinal rod 25 of frame 2 as shown at 26, and a rod 27 is pivotally suspended from rod 25 with sleeves 28 pivoted to the rod 27 as shown at 29, and the cross-rods 22 telescope in sleeves 28 and are yieldably projected and retracted, as for example by shock cord 30 connecting the rods 22 and wrapped around angular braces 31 of the frame 2 in front and in rear of the sleeves 28. The cord 30 thus provides a shock absorber for vertical movement between the running gear and the frame 2, and also yieldably tensions lateral tilting or swinging of the frame with relation to the running gear.

The frame 2 is adapted to be locked against lateral tilting at the pivotal connections 26, and for this purpose the pivotally suspended rod 27 is shown as extending downwardly below pivotal connection 29 so as to form a tongue 33 which is adapted for reception between upstanding lugs 34 on the lower longitudinal rod 35 of frame 2, and a pin 36 is adapted for projection through the lugs 34 and the tongue 33, thereby locking the frame 2 against lateral tilt with relation to pivotal connection 29 of the running gear; or the pin may be withdrawn so as to free the tongue 33 for lateral tilting of frame 2 with relation to pivotal connection 29 as shown by broken lines in Fig. 4, with the shock cord 30 yieldably resisting and finally stopping said lateral movement of the frame so as to tension and limit the tilting thereof with relation to the running gear. The pin 36 may be operated from seat 10, and for this purpose is shown connected to a hand lever 37 which extends upwardly adjacent the operator's seat.

The lower rod 35 of the frame preferably curves downwardly from upper rod 25 at the front of the apparatus as shown in Fig. 2, and may be provided with a skid bar 40 adapted for contact with the ground in the event of excessive surface irregularities causing such rebound of shock cord 30 as will result in undue depression of frame 2 with relation to the running gear, and the tail skid 6 is adapted for yieldable contact with the ground, as for example by pivoting the tail skid as shown at 41 and wrapping the same with shock cord 42, so as to cushion the support of the tail of the apparatus on the ground, and the tail skid is also pivoted on a vertical axis as shown at 43, so that with the tail skid on the ground and the apparatus in motion, it may be readily directionally controlled by operating the directional rudder 4.

When instructing a novice in the principles of aviation, he takes his place in seat 10, and with the frame 2 locked against lateral tilt relative to the running gear, the engine 14 is started so as to propel the apparatus with tail skid 6 remaining in contact with the ground as a result of the stick 11 being left in a neutral position so that elevating rudder 5 does not lift the tail of the apparatus. By operating rudder bar 12 so as to move directional rudder 4, the pupil then practices directional control, and when this is mastered, and with the frame 2 still locked against lateral tilt, the pupil practices fore-and-aft movement of stick 11 so as to operate elevating rudder 5 for raising the tail of spine 2 until the apparatus, with the running gear still on the ground, is on an even keel in a fore-and-aft direction. The pupil is thus taught longitudinal stabilization, and then practices coordination of both longitudinal and directional control. When this is mastered the frame 2 is unlocked for tensioned lateral tilt or swing with relation to the running gear which still remains on the ground, and by lateral movement of stick 11 the ailerons 9 are operated so as to laterally stabilize the tiltable frame. The pupil then practices this lateral control, including banking of plane 7 when the direction of movement of the apparatus is changed, and thus learns to coordinate directional movement with both fore-and-aft and lateral stabilization.

A novice may thus be given primary instructions in the principles of aviation without the running gear of the apparatus leaving the ground and while propelled at a safe speed, it being possible at a relatively slow speed and as a result of the exaggeration in the proportions of the ailerons and the rudder surfaces to teach the exact "feel" of an aircraft in rapid flight, and thus enable the pupil to learn and practice both directional and lateral and fore-and-aft control.

We claim:

1. A training apparatus simulating an airplane and comprising laterally spaced ground contacting means adapted for movement along the ground, a longitudinal spine supported at its forward end by the ground contacting means, means for mounting the spine laterally tiltable with relation to the ground contacting means, wings projecting laterally from the spine at its forward end, and means for adjusting the wings while the ground contacting means move along the ground so as to laterally stabilize the spine and wings with relation to the ground contacting means.

2. A training apparatus simulating an airplane and comprising laterally spaced ground contacting means adapted for movement along the ground, a longitudinal spine supported at its forward end by the ground contacting means, means for mounting the spine laterally tiltable with relation to the ground contacting means, wings projecting laterally from the spine at its forward end, means for adjusting the wings while the ground contacting means move along the ground so as to laterally stabilize the spine and wings with relation to the ground contacting means, and a directional rudder at the tail of the spine.

3. A training apparatus simulating an airplane and comprising laterally spaced ground contacting means adapted for movement along the ground, a longitudinal spine supported at its forward end by the ground contacting means, means for mounting the spine tiltable laterally and fore-and-aft with relation to the ground contacting means, wings projecting laterally from the spine at its forward end, means for adjusting the wings while the ground contacting means move along the ground so as to laterally stabilizing the spine and wings with relation to the ground contacting means, and an elevating rudder at the tail of the spine.

4. A training apparatus simulating an airplane and comprising laterally spaced ground contacting means adapted for movement along the ground, a longitudinal spine supported at its forward end by the ground contacting means, means for mounting the spine tiltable laterally and fore-and-aft with relation to the ground contacting means, wings projecting laterally from the spine at its forward end, means for adjusting the wings while the ground contacting means move along the ground so as to laterally stabilize the spine and wings with relation to the ground contacting means, and an elevating rudder and a directional rudder at the tail of the spine.

5. A training apparatus simulating an airplane and comprising laterally spaced ground contacting means adapted for movement along the ground, a longitudinal spine supported at its forward end by the ground contacting means, means for mounting the spine laterally tiltable with relation to the ground contacting means, means for yieldably restraining the spine against said lateral tilt, wings projecting laterally from the spine at its forward end, and means for adjusting the wings while the ground contacting means move along the ground so as to laterally stabilize the spine and wings with relation to the ground contacting means.

6. A training apparatus simulating an airplane and comprising laterally spaced ground contacting means adapted for movement along the ground, a longitudinal spine supported at its forward end by the ground contacting means, means for mounting the spine laterally tiltable and vertically movable with relation to the ground contacting means, means for yieldably restraining the spine against said lateral tilt and vertical movement, wings projecting laterally from the spine at its forward end, and means for adjusting the wings while the ground contacting means move along the ground so as to laterally stabilize the spine and wings with relation to the ground contacting means.

7. A training apparatus simulating an airplane and comprising laterally spaced ground contacting means adapted for movement along the ground, a longitudinal spine supported at its forward end by the ground contacting means, means for mounting the spine laterally tiltable with relation to the ground contacting means, means for releasably locking the spine against said lateral tilt, wings projecting laterally from the spine at its forward end, and means for adjusting the wings while the ground contacting means move along the ground and the locking means is released so as to laterally stabilize the spine and wings with relation to the ground contacting means.

8. A training apparatus simulating an airplane and comprising laterally spaced ground contacting means adapted for movement along the ground, a longitudinal spine supported at its forward end by the ground contacting means, means for mounting the spine laterally tiltable with relation to the ground contacting means, an operator's seat carried by the spine at its forward end, wings projecting laterally from the spine at its forward end, and means for adjusting the wings from the operator's seat while the ground contacting means move along the ground so as to laterally stabilize the spine and wings with relation to the ground contacting means.

9. In combination, ground contacting means adapted for movement along the ground, a wing structure supported by the ground contacting means, means for mounting the wing structure laterally tiltable with relation to the ground contacting means, and means for adjusting the wing structure while the ground contacting means moves along the ground so as to laterally stabilize the wing structure with relation to the ground contacting means.

10. In combination, ground contacting means adapted for movement along the ground, a wing structure supported by the ground contacting means, means for mounting the wing structure laterally tiltable with relation to the ground contacting means, a directional rudder operatively supported with relation to the wing structure, and means for adjusting the wing structure while the ground contacting means moves along the ground so as to laterally stabilize the wing surface with relation to the ground contacting means.

11. In combination, ground contacting means adapted for movement along the ground, a wing structure supported by the ground contacting means, means for mounting the wing structure tiltable laterally and fore-and-aft with relation to the ground contacting means, an elevating rudder operatively supported with relation to the wing structure, and means for adjusting the wing structure while the ground contacting means moves along the ground so as to laterally stabilize the wing structure with relation to the ground contacting means.

12. In combination, ground contacting means adapted for movement along the ground, a wing structure supported by the ground contacting means, means for mounting the wing structure tiltable laterally and fore-and-aft with relation to the ground contacting means, an elevating rudder and a directional rudder operatively supported with relation to the wing structure, and means for adjusting the wing structure while the ground contacting means moves along the ground so as to laterally stabilize the wing structure with relation to the ground contacting means.

13. In combination, ground contacting means adapted for movement along the ground, a wing structure supported by the ground contacting means, means for mounting the wing structure laterally tiltable with relation to the ground contacting means, means for yieldably restraining the wing structure against said lateral tilt, and means for adjusting the wing structure while the ground contacting means moves along the ground so as to laterally stabilize the wing structure with relation to the ground contacting means.

14. In combination, ground contacting means adapted for movement along the ground, a wing structure supported by the ground contacting means, means for mounting the wing structure laterally tiltable and vertically movable with relation to the ground contacting means, means for yieldably restraining the wing structure against said lateral tilt and vertical movement, and means for adjusting the wing structure while the ground contacting means moves along the ground so as to laterally stabilize the wing structure with relation to the ground contacting means.

15. In combination, ground contacting means adapted for movement along the ground, a wing structure supported by the ground contacting means, means for mounting the wing structure laterally tiltable with relation to the ground contacting means, means for releasably locking the wing structure against said lateral tilt, and means for adjusting the wing structure while the ground contacting means moves along the ground and the locking means is released, so as to laterally stabilize the wing structure with relation to the ground contacting means.

16. In combination, ground contacting means, a wing structure supported by the ground contacting means, means for mounting the wing structure laterally tiltable with relation to the ground contacting means, an operator's seat fixed relative to the wing structure, and means operable from said seat for adjusting the wing structure while the ground contacting means moves along the ground so as to laterally stabilize the wing structure with relation to the ground contacting means.

In testimony whereof we have affixed our signatures.

OMER L. WOODSON.
HARRY S. MYHRES.